Figure 1:
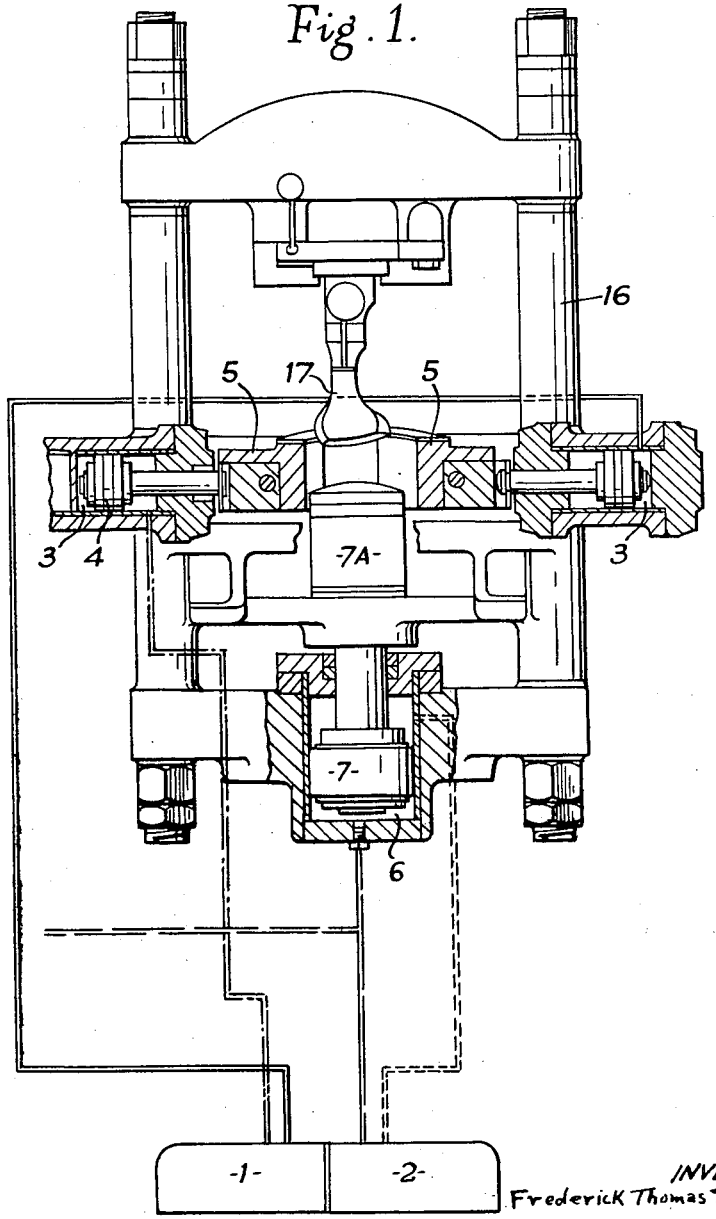

March 7, 1961 F. T. TURNER 2,973,553
APPARATUS FOR USE IN THE MANUFACTURE OF VULCANIZED FOOTWEAR
Filed April 24, 1957 3 Sheets-Sheet 1

INVENTOR
Frederick Thomas Turner

BY
Corey, Hart & Stemple
ATTORNEY

INVENTOR
Frederick Thomas Turner
BY
Corey, Hart & Stemple
ATTORNEY

United States Patent Office 2,973,553
Patented Mar. 7, 1961

2,973,553

APPARATUS FOR USE IN THE MANUFACTURE OF VULCANIZED FOOTWEAR

Frederick Thomas Turner, Somerset, England, assignor to C.I.C. Engineering Limited, Somerset, England, a British company Filed Apr. 24, 1957, Ser. No. 654,918

Claims priority, application Great Britain May 9, 1956

19 Claims. (Cl. 18—17)

This invention is concerned with apparatus for molding and simultaneously securing, by vulcanization, shoe soles of vulcanizable material to the undersides of pre-lasted shoe-uppers; the term "shoe" is used herein generically to indicate outer footwear whether complete or only partly manufactured.

The expression "sole" is intended to include a heel in addition to the forepart of a shoe tread surface and to include also integrated extensions such as walls or mudguards extending from the peripheral boundaries of the lower tread surface to embrace and to be secured to the adjacent shoe upper.

The invention relates more specifically to apparatus having a plurality of heated molds each composed of divisible, mutually co-operable components and each adapted to contain a mass of un-vulcanized elastomer (such as, for example, natural or synthetic rubber or polymerizable derivatives thereof), the mass being molded to a required sole shape by pressure derived from a movable mold component and simultaneously engaged with the underside of a pre-lasted shoe upper carried by a fixedly restrained last and constituting one boundary of the mold cavity. The molded sole is thus bonded to the said shoe upper, during the vulcanizing cycle in which cycle the mold components remain immobile.

Apparatus of this general character known hitherto have been provided in various mechanical combinations and have, in the main, required a considerable degree of supervision and manual operation. Notwithstanding the introduction of power-operated or power-assisted mold components, the molding and vulcanizing cycle has generally been manually effected, either directly or through the medium of manually operated mechanical means.

The object of the present invention is to provide improved apparatus for the purpose above referred to, which is characterized in that the molding and vulcanizing cycle is initiated and controlled by means responsive to the positive location of components defining the mold cavity.

Another object of the invention is to provide a vulcanizing machine incorporating this characteristic feature, said machine having a pressure fluid circuit for effecting movement of mold cavity forming components, this pressure fluid circuit being under control of a plurality of solenoid-operated valves energizable by electric circuit opening and closing means which are operated in the required sense by the movement of the actuated mold components. A further object of the invention is to provide a vulcanizing machine for the purpose referred to, in which the cyclic operation of the apparatus is substantially automatic following manual selective initiation of a vulcanizing sequence upon a loaded last.

Another object of the present invention is to apply the abovementioned characteristic feature—that is, initiation and control of the molding and vulcanizing cycle by means responsive to the positive location of components constituting the mold cavity—to a vulcanizing machine of the kind in which a pre-lasted shoe upper is suspended between side mold components which are adapted to close on to the last-supported upper through pressure applied by means of pistons directly connected to said side mold components and housed in separate cylinders, at least one cylinder and piston being provided for each side mold component. A fluid-operated ram directly connected to a sole mold component may be employed in combination with the fluid-operated side mold components.

In a vulcanizing machine of the kind above referred to, it is known to include in the fluid circuit a so-called sequence valve or equivalent fluid-operated device for delaying the application of pressure or of full pressure to the sole mold component until full pressure has been applied by the side mold components to a last-suspended shoe upper.

It has also been proposed to employ electrically-actuated valve means operable to feed pressure fluid to the side mold cylinders to effect opening and closing of said side mold components positively and solely by fluid pressure and to make use of sequence valve means operable on rise of fluid pressure—occasioned when said side mold components are arrested in position wherein they confine a shoe upper carried on said last—to direct pressure fluid sequentially to a sole block cylinder to apply pressure on a sole on said sole block to vulcanize it to the shoe upper.

In such an arrangement it was proposed to make use of electrical switch means, including a manually operable switch, for bringing into action the electrically-actuated valve means, of timing mechanism pre-settable to put said electrically-actuated valve means out of action after a required vulcanizing period, and of further switch means operable by retraction of said sole block to cut out of action the timing mechanism. By adopting the characteristic feature already referred to it is possible to dispense entirely with a sequence valve or equivalent fluid-operated means.

The accompanying drawings illustrate diagrammatically, and by way of example, electro-fluid control systems for a twin-head vulcanizing machine of the kind referred to, no fluid-operated sequence valves being employed in these control systems.

Figure 2:
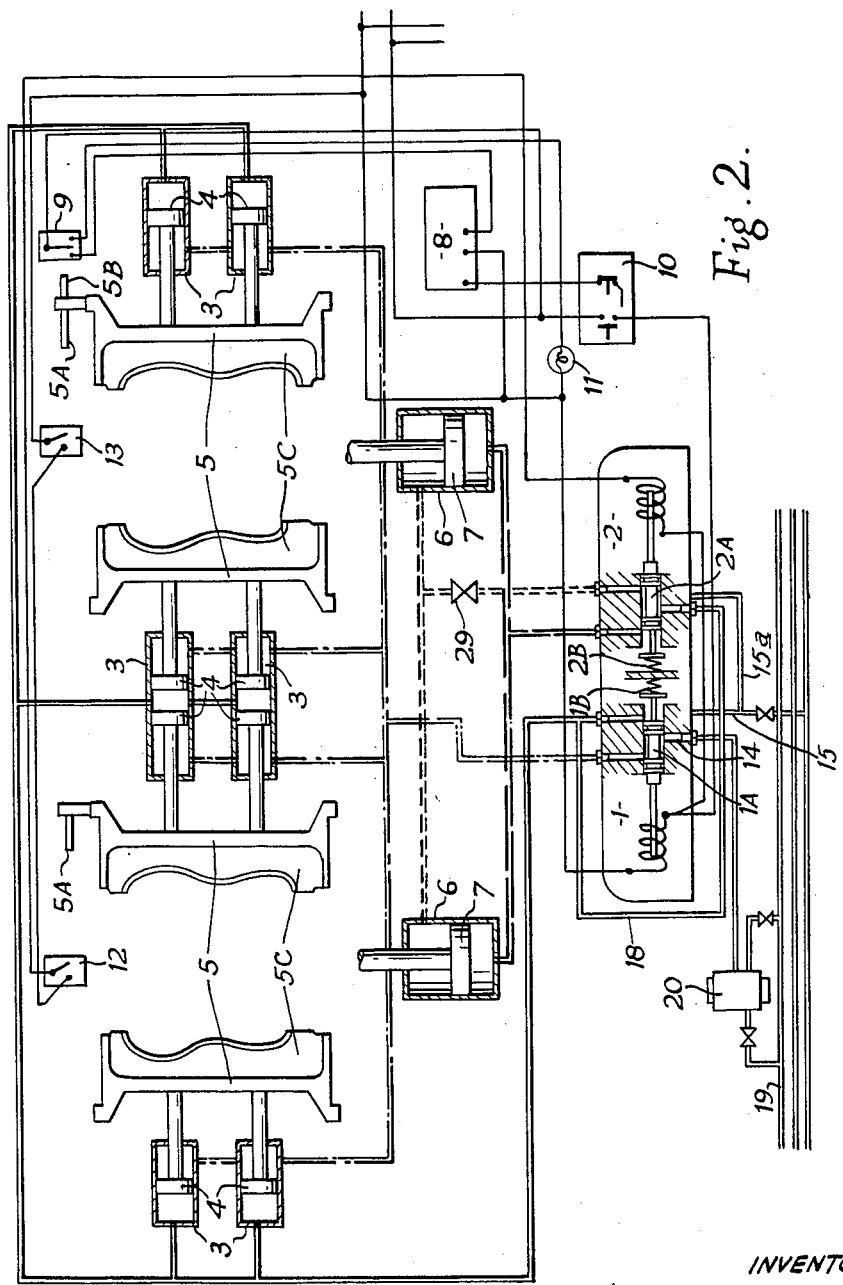
Figure 3:
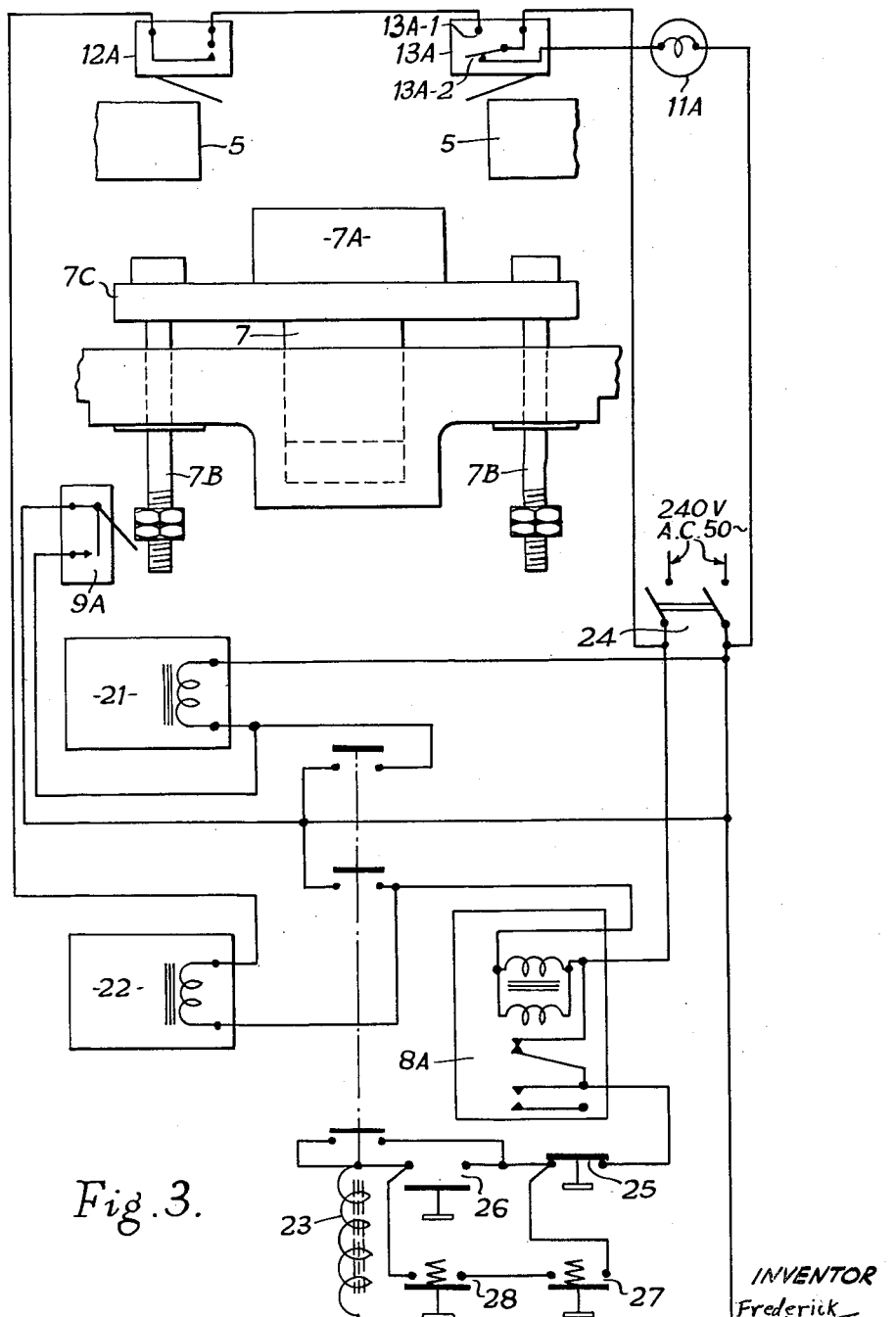

In the drawings:

Figure 1 illustrates the main components of part of a twin-head machine, the fluid operating means being represented diagrammatically but with the electrical controls omitted for clearness, Figure 2 illustrates an arrangement in which control is effected in response to movement of the side mold components of the machine, and Figure 3 illustrates an alternative arrangement in which some control is additionally effected in response to movement of the sole mold component of the machine.

In the embodiment illustrated in Figures 1 and 2, two solenoid-operated fluid-control valves 1, 2 are provided, valve 1 being pipe-coupled to cylinders 3 of both heads of the machine, said cylinders 3 housing pistons 4 directly connected to side mold carriers 5. The valve 2 is similarly coupled to the two cylinders 6 of the machine housing rams 7 directly connected to sole mold components 7A.

Each pair of side mold components 5C and the cooperating sole mold component 7A constitute a plurality of mold cavity forming components and these are mounted for movement on frame 16 relatively to the associated stationary last 17 which supports a shoe upper in a position to complete the mold cavity, said last 17 being movable into and out of the working position in known manner.

The fluid circuitry is under general control of a timing mechanism 8 (Fig. 2) in known manner, but this is influenced, as hereinafter more particularly described by being electrically connected with a suitably placed two-way switch 9.

The closing of a starter switch 10 causes energizing of solenoid valve 1 which supplies fluid under pressure to cylinders 3 to effect closing together of the side mold components 5C provided on the carriers 5. Initial movement of the side mold carrier 5 with which switch 9 is associated, serves to operate said switch, thereby completing the circuit of timing mechanism 8, holding closed the circuit of the solenoid of valve 1, and, if desired, extinguishing a signal lamp 11. Full closing of the side mold components 5C effects operation through pins or projections 5A on mold carriers 5 of micro-switches 12, 13 which are connected in series to ensure closure of both molds before the sole rams 7 can be elevated, and the closed switches 12, 13 bring into circuit the solenoid valve 2 which permits of the flow of pressure fluid to the sole mold cylinders 6. Preferably, as shown, switch 12 is made responsive to the closing action of the inner mold carriers and switch 13 is similarly responsive to movement of one of the outer mold carriers.

Upon expiry of a preset vulcanizing period the timing mechanism 8 (in known manner) functions to de-energize the solenoids of both valves 1 and 2, permitting the valve spools 1A, 2A (Fig. 2) which are biased in one direction by springs 1B, 2B respectively to move to reverse the direction of fluid flow and thus open the molds. The solenoid valve 2 may be tapped from one side of solenoid valve 1, by connection 18, to ensure that the required sequential operation is preserved and also to guard against malfunctioning of the apparatus, due for instance to accidental or deliberate actuation of switches 12, 13. The starter switch 10 must be maintained closed or the two-way switch 9 must be in an operative position before switches 12, 13 become wholly operative.

The two-way switch 9, operable by a pin or projection 5B, may be employed in conjunction with either of the outer side mold carriers 5 or may be duplicated to provide a two-way switch for ecah mold assembly. The two-way switch need not, however, be positioned for operation by an outer side mold carrier but, as described with reference to Fig. 3, may be arranged for operation through a sole block or an associated moving part of the machine.

It will be evident that it is desirable to guard against maltreatment or accidental operation of the switches 9, 12 and 13 when the starter switch 10 has been closed. To some extent a safeguard is provided by interlocking the two switches 12 and 13, by a series connection, but more positive safeguarding is preferred. This may be effected by shielding the switches within casings or enclosures having apertures for the passage of pin-like projections (such as 5A, 5B) by means of which alone the switches can be operated; it may be so arranged that the switch-operating projections never expose the corresponding apertures during opening and closing movements of the associated mold components.

The solenoid valve 1 is supplied at inlet 14 with fluid under pressure from pressure line 19 via a reducing valve 20 and used fluid is returned to a pressure power unit (not shown) for re-use through outlets 15, 15a.

Figure 3, which for clearness omits fluid circuitry, shows a modified arrangement wherein a normally-open microswitch 12A operable by one side mold component carrier 5 is in series with a normally-open part 13A–1 of another microswitch 13A operable by the other side mold component carrier 5, the switch 13A having also a normally-closed part 13A–2 in series with an indicator lamp 11A, both parts of the switch 13A being connected to the two sides of a double-pole main switch 24. Two constantly rated spring-return solenoid-operated valves 21, 22 are provided for controlling flow of oil under pressure to the side mold cylinders 3 and the sole mold cylinders 6 respectively, and these valves 21, 22 are under control of a contactor 23 of conventional form.

The contactor 23 is connected to a timer 8A of conventional form and the contactor 23 and the timer 8A are also connected to stop and start buttons 25, 26 respectively associated with the contactor 23. A microswitch 9A, operable by one of the guides 7B of the sole mold platen 7C, is connected to the sole mold valve 22 and the contactor 23, this arrangement ensuring that the sole mold component is fully retracted, at the completion of a molding cycle, before the side mold components are opened. One reason for this sequential operation is that if there is any tendency for the molded rubber to adhere to the sole mold component, the withdrawal of the side mold components might aggravate a tendency for the molded sole to part from the shoe upper; the presence of the side mold components affords a compressive force which resists this parting of sole and upper.

Closure of the start button 26 on the contactor 23 results in energization of the solenoid valve controlling supply of fluid to the side mold cylinders. Complete closure of the side mold components effects closing of the switches 12A, 13A, thereby extinguishing the indicator lamp 11A and completing a circuit to cause energization of the solenoid valve controlling the flow of pressure fluid to the sole mold cylinder. On completion of the molding cycle, the timer 8A serves to de-energize the solenoid of the sole mold valve 22 which is then spring-returned to a retracted condition, which is arranged to coincide with closing of the microswitch 9A, and which thus effects de-energization of the solenoid of the side mold valve 21. Pressure exerted on the stop button 25 on the contactor 23, or a complete failure of the main supply, results in de-energization of the solenoid valves 21, 22 and the opening of the side molds and sole mold components.

If desired two switches 27, 28 may be provided, as shown, one at each operating station of a twin-head machine and responsive to closure of the last latch plate at each station, so that the required sequence operation is initiated only when both lasts are loaded and latched. The switches 27, 28 are connected in series to ensure that the operation cannot be initiated until both switches are closed.

A further precautionary feature may be introduced in the form of a restrictor valve 29 (Fig. 2) inserted in the fluid line which connects the closed ends of the sole mold cylinders 6 with solenoid valve 2. The reason for this precaution is that if the sole mold pistons 7 are raised immediately the switches 12 and 13 effect operation of the solenoid valve 2, there is the possibility of a pressure drop occurring in the fluid line referred to. As a result the side mold components 5 may tend to open slightly and to remain so after the sole mold component has contacted with and thus pressed the rubber sole blank, resulting in some of the rubber being forced out between the last-suspended upper and the side mold components 5C, and thereby preventing complete closure of the mold cavity. The insertion in the fluid line of the restrictor valve 29 prevents this from happening.

I claim:
1. Apparatus for molding and vulcanizing a shoe sole to a prelasted shoe upper comprising a frame, a last mounted on said frame, a plurality of mold units mounted on said frame and cooperating with said last to form a mold cavity for the shoe sole, said units including a side mold unit having a laterally movable mold component and a sole mold unit having a vertically movable mold component, means for moving the mold component of said side mold unit from open mold position to closed mold position, second means for moving the mold com- ponent of said sole mold unit from open mold position to closed mold position, means operable to actuate said first means to move its associated mold component to closed mold position, electrical control means operable independently of said first means to actuate said second means to move its associated mold component to closed mold position, a movable member of said side mold unit controlling said control means and engaging the latter to actuate the same after the mold component of said side mold unit has moved through a particular distance in the closing direction.

2. Apparatus for molding and vulcanizing a shoe sole to a prelasted shoe upper comprising a frame, a last mounted on said frame, two oppositely acting side mold components movably mounted for lateral movement on said frame and cooperating with said last to form a mold cavity for the shoe sole, a sole mold component movably mounted for vertical movement on said frame for cooperation with said oppositely acting side mold components to form the mold cavity with said last, fluid-operated circuitry for moving said mold components toward said last in a predetermined sequence to closed mold position in a molding and vulcanizing cycle, and electrical means including an electrical switch and a switch actuating element connected to one of said oppositely acting side mold components and movable therewith for controlling said fluid-operated circuitry to actuate said sole mold component after said oppositely acting components have traveled a particular distance in the closing direction.

3. Apparatus for molding and vulcanizing a shoe sole to a prelasted shoe upper comprising a frame, a last mounted on said frame, a plurality of mold units mounted on said frame and each including a mold component cooperating with said last to form a mold cavity for the shoe sole, said units including a side mold unit having a laterally movable mold component and a sole mold unit having a vertically movable mold component, means for actuating said side mold unit to move the mold component thereof from open mold position to closed mold position, second means for actuating said sole mold unit to move the mold component thereof from open mold position to closed mold position and including an electrical control device positioned at a particular place with relation to the path of travel of the mold component of said side mold unit, said side mold unit including an element movable with the mold component thereof and engageable with said control device on movement of such mold component in the closing direction to actuate the same to cause said second means to initiate the movement of said sole mold unit to closed mold position.

4. Apparatus for molding and vulcanizing a shoe sole to a prelasted shoe upper comprising a frame, a last mounted on said frame, two oppositely acting side mold components movably mounted for lateral movement on said frame for cooperation with said last to form a mold cavity for the shoe sole, fluid pressure means for moving said side mold components from open mold position to closed mold position, a sole mold component movably mounted for vertical movement on said frame for cooperation with said last to form such mold cavity, second fluid pressure means for moving said sole mold component from open mold position to closed mold position, means operable to cause said first fluid pressure means to move said oppositely acting components to closed mold position, electrical control means operable independently of said first fluid pressure means to cause said second fluid pressure means to move said sole mold component to closed position, an element connected to said oppositely acting mold components and movable therewith for controlling said electrical control means, said element being engageable with said control means to operate the latter when at least one of said oppositely acting mold components has been moved to a particular place in the closing direction by said first fluid pressure means and thereby to initiate the movement of said sole mold component to closed mold position.

5. Apparatus for molding and vulcanizing a shoe sole to a prelasted shoe upper comprising a frame, a last mounted on said frame, two oppositely acting side mold components movably mounted for lateral movement on said frame for cooperation with said last to form a cavity for the shoe sole, fluid pressure means for moving said side mold components from retracted positions toward said last to closed mold positions, a sole mold component mounted on said frame for movement in directions at right angles to the directions of movement of said side mold components, a second fluid pressure means for moving said sole mold component toward said last to closed mold position, means operable to cause said first fluid pressure means to move said side mold components to closed mold position, electrical control means including an electric switch operable independently of said first fluid pressure means to cause said second fluid pressure means to move said sole mold component to closed position, a switch actuating element connected to one of said side mold components and movable therewith for controlling said electrical control means, said element being engageable with said electric switch to operate said control means when said side mold components have been moved by said first fluid pressure means to particular places relative to said last in the closing direction and thereby to initiate the movement of said sole mold to closed position.

6. Apparatus for molding and vulcanizing a shoe sole to a prelasted shoe upper comprising a frame, a last mounted on said frame, a plurality of mold components movably mounted on said frame and cooperating with said last to form a mold cavity for the shoe sole, said components including a laterally movable side mold component and a vertically movable sole mold component, a source of pressure fluid, fluid-operated circuitry for moving said mold components to open and close the mold including electrically operated valve means for controlling the movement of pressure fluid from said source through said circuitry, means for controlling the operation of said valve means including electrical switch means, means forming part of and movable with said side mold component to actuate said switch means to cause said valve means to establish flow of pressure fluid to move said sole mold component to closed position after said side mold component has arrived at a particular place in its travel in the closing direction, and said controlling means including means operable to actuate said switch means to cause said valve means to operate to retract at least said sole mold component at the end of the vulcanizing cycle.

7. Apparatus for molding and vulcanizing a shoe sole to a prelasted shoe upper comprising a frame, a last mounted on said frame, a plurality of mold components movably mounted on said frame and cooperating with said last to form a mold cavity for the shoe sole said components including a laterally movable side mold component and a vertically movable sole mold component, a source of fluid pressure, fluid-operated circuitry for moving said mold components to open and close the mold and including a plurality of solenoid-operated valves operable to control the movement of pressure fluid from said source through said circuitry, and menas for controlling the operation of said solenoid-operated valves including electrical switch means, means forming part of and movable with said side mold component and operable to actuate said switch means to operate one of said solenoid-operated valves to move said sole mold component to closed condition after said side mold component has arrived at a particular place in its travel in the closing direction, and said controlling means including means operable to actuate said switch means to operate the other of said solenoid-operated valves to retract at least said sole mold component at the end of the vulcanizing cycle.

8. Appartaus for molding and vulcanizing a shoe sole to a prelasted shoe upper comprising a frame, a last mounted on said frame, a plurality of mold components movably mounted on said frame for cooperation with said last to form a mold cavity for the shoe sole and including a lateraly movable side mold component and a vertically movable sole mold component, fluid pressure means including a solenoid-operated valve for moving said side mold component to open and closed mold positions, second fluid pressure means including a solenoid-operated valve for moving said sole mold component to open and closed mold positions, an electrical circuit including said solenoid-operated valves, a first electrical switch means operable to actuate the solenoid-operated valve of said first mentioned fluid pressure means to move said side mold components to closed mold position, second electrical switch means operable to actuate the solenoid-operated valve of said second fluid pressure means to move said sole mold component to closed mold position, and third electrical switch means operable to actuate at least the solenoid-operated valve of said second fluid pressure means to retract said sole mold component at the end of the vulcanizing cycle, and an element movable with said side mold component and operable to actuate said second electrical switch means to initiate the closing movement of said sole mold component after such side mold component has moved in the closing direction to a particular place.

9. Apparatus for molding and vulcanizing a shoe sole to a prelasted shoe upper comprising a frame, a last mounted on said frame, a plurality of mold components including a side mold component movably mounted for lateral movement on said frame and a sole mold component movably mounted for vertical movement on said frame, said side and sole mold components cooperating with said last to form a mold cavity for the shoe sole, a source of pressure fluid, fluid-operated circuitry for moving said side and sole mold components to open and close the mold including electrically operated valve means for controlling the flow of pressure fluid from said source through said circuitry, an electrical circuit including said electrically operated valve means and first means operable to actuate said valve means to move said sole mold component to closed position, an element forming part of and movable with said side mold component and operable to actuate said first circuit means to initiate the movement of said sole mold component to closed mold position after such said mold component has arrived at a particular place in its travel in the closing direction, and said electrical circuit including second means comprising timing mechanism and switch means controlling said timing mechanism, said second circuit means being operable to actuate said valve means to cause the retraction from closed mold position of at least said sole mold component at the end of the vulcanizing cycle.

10. Apparatus as claimed in claim 9 in which said first circuit means includes an electrical switch located adjacent the fully closed position of said side mold component, and said element forming part of said side mold component, being responsive to movement of said side mold component to fully closed position with relation to said last to actuate said electrical switch.

11. Apparatus as claimed in claim 9 in which said mold components include two side molds and each of said side molds has an element forming part of and movable therewith, and in which said first circuit means includes an electrical switch located adjacent the fully closed position of each of said side molds, said switches being arranged in series and both controlling the actuation of said valve means to move said sole mold component to closed position, said side mold elements being responsive to movement of said side molds to fully closed position with relation to said last to actuate said electrical switches.

12. Apparatus as claimed in claim 9 in which said electrically operated valve means comprises two solenoid-operated valves, one of said valves controlling the movement of pressure fluid from said source to said sole mold component and being controlled by said element forming part of said side mold component, and the other of said valves controlling the movement of pressure fluid from said source to said side mold component, and means in said electrical circuit operable to control said other valve.

13. Apparatus as claimed in claim 9, including a second element forming part of and movable with said sole mold compartment, and in which said switch means of said second circuit means comprises a switch located in the path of movement of said second element and operable by the latter after said sole mold component at the end of the vulcanizing cycle has moved from closed mold position to a particular place in the opening direction, to actuate said valve means to cause the retraction of said side mold component from closed mold position.

14. Apparatus as claimed in claim 9, in which said electrically operated valve means comprises two solenoid-operated valves, one of said valves controlling the movement of pressure fluid from said source to said sole mold component and being controlled by said element forming part of said side mold component, and the other of said valves controlling the movement of pressure fluid from said source to said side mold component, and including a second element forming part of and movable with said sole mold component, and in which said switch means of said second circuit means comprises a switch located in the path of movement of said second element and operable by the latter after said sole mold component at the end of the vulcanizing cycle has moved from closed mold position to a particular place in the opening direction, to actuate said other valve to cause the retraction of said side mold component from closed position.

15. Apparatus as claimed in claim 9, in which said electrical circuit includes switch means operable to actuate said valve means initially to move said side mold component to closed position, said timing mechanism being operable at the end of the vulcnaizing cycle to actuate said valve means to cause the retraction of said sole mold component, and in which said switch means of said second circuit means comprises an electrical switch operable to actuate said valve means to cause the retraction of said side mold component, said electrical switch being operative in response to movement of said sole mold component from closed mold position to a particular place in the opening direction to cause side retraction of said mold component.

16. Apparatus for molding and vulcanizing a shoe sole to a prelasted shoe upper comprising a frame, a last mounted on said frame, a plurality of mold components including a side mold component movably mounted for lateral movement on said frame and a sole mold component movably mounted for vertical movement on said frame, said side and sole mold components cooperating with said last to form a mold cavity for the shoe sole, fluid pressure means for moving said side mold component to closed and open mold positions, second fluid pressure means for moving said sole mold component to closed and open mold positions, means operable to cause said first fluid pressure means to move said side mold component from one mold position to another, and electrical control means operable independently of said first fluid pressure means to cause said second fluid pressure means to move said sole mold component from a condition of rest at a mold position corresponding to said one position of said side mold component to the mold position thereof corresponding to the other mold position toward which said side mold component has been moved, said first mold component controlling said electrical control means and being operative on arrival thereof at a particular place when moved toward such other position thereof to actuate siad electrical control means to initiate the movement of said sole mold component towards its corresponding mold position.

17. A shoe sole vulcanizing machine comprising in combination, a framework, a shoe last mounted on said framework, a plurality of mold units mounted on said frame and coacting with said last to form a mold cavity for the shoe sole, said units including a side mold unit having a laterally movable mold component and a sole mold unit having a vertically movable mold component, each of said side and sole mold units further comprising double acting hydraulic means for actuating said side and sole mold components, means for supplying fluid under pressure for said hydraulic means, means for applying fluid pressure supplied by said supply means to one side of said hydraulic means to movè said mold components positively to closed mold position, said applying means including time controlled electrically operated valve means located between said supply means and said hydraulic means and controlling the flow of fluid pressure from the former to the latter, and means operable to actuate said valve means to cause the fluid pressure to flow to said one side of said hydraulic means, and means for removing the fluid pressure on said one side of said hydraulic means and for applying the fluid pressure to the other side of said hydraulic means to retract said mold components positively to open position, said last mentioned means including said valve means, means controlling said valve means, actuating means carried by one of said mold units, actuatable means cooperable with said actuating means, said actuating and actuatable means automatically coacting when the hydraulic means of such mold unit moves its mold component to closed mold position, to operate said valve controlling means, said operated controlling means automatically actuating said valve means to divert the fluid pressure supplied by said supply means from said one side of said hydraulic means to the other sides thereof, and means operable when said valve means operates to cause said sole mold unit to retract the sole mold component thereof to open position, to cause the removal of said sole mold component from closed mold position by its associated hydraulic means before said side mold component is withdrawn from such closed mold position by its associated hydraulic means.

18. A shoe sole vulcanizing machine comprising in combination, a framework, a shoe last mounted on said framework, a plurality of mold units mounted on said frame and coacting with said last to form a mold cavity for the shoe sole, said units including a side mold unit having a laterally movable mold component and a sole mold unit having a vertically movable mold unit, each of said side and sole mold units further comprising double acting hydraulic means for actuating said side and sole mold components, means for supplying fluid under pressure for said hydraulic means, means for applying fluid pressure supplied by said supply means to one side of said hydraulic means to move said mold components positively to closed mold position, said applying means including time controlled electrically operated valve means located between said supply means and said hydraulic means and controlling the flow of fluid pressure from the former to the latter, and means operable to actuate said valve means to cause the fluid pressure to flow to said one side of said hydraulic means, and means for removing the fluid pressure on said one side of said hydraulic means and for applying the fluid pressure to the other side of said hydraulic means to retract said mold components positively to open position, said last mentioned means including said valve means, means controlling said valve means, switch actuating means carried by one of said mold units, switch means cooperable with said actuating means, said actuating and switch means automatically operating to render said valve controlling means inoperative when the mold component thereof is withdrawn from closed mold position and to render said controlling means operative to actuate said valve controlling means when such mold component advances to closed mold position, said operated controlling means automatically actuating said valve means to divert the fluid pressure supplied by said supply means from said one side of said hydraulic means to the other sides thereof, and means operable when said valve means operates to cause said sole mold unit to retract the sole mold component thereof to open position, to cause the removal of said sole mold component from closed mold position by its associated hydraulic means before said side mold component is withdrawn from such closed mold position by its associated hydraulic means.

19. Apparatus for molding and vulcanizing a shoe sole to a prelasted shoe upper comprising a frame, a last mounted on said frame, a plurality of mold units mounted on said frame and cooperating with said last to form a mold cavity for the shoe sole, said units including a side mold unit having a lateraly movable side mold component and a sole mold unit having a vertically movable mold component, a source of pressure fluid, fluid-operated circuitry for moving said side and sole mold components to open and close the mold including electrically operated valve means for controlling the flow of pressure fluid from said source through said circuitry, an electrical circuit including said electrically operated valve means and first means operable to actuate said valve means to move said side and sole mold components to closed position, and said electrical circuit including second means comprising timing mechanism and switch means controlling said timing mechanism, said second circuit means being operable to actuate said valve means to cause the retraction from closed mold positions of said side and sole mold components at the end of the vulcanizing cycle, means controlled by said side mold unit and operable to initiate the movement of said sole mold component to closed position after said side mold unit has moved its side mold component toward closed mold position, means controlled by one of said mold units and controlling said switch means in said second circuit means to render said timing mechanism inoperative when the mold component thereof is withdrawn from closed mold position and to render said timer operative when such mold component has been moved toward closed mold position, and means operable when said timer actuates said valve means to cause the retraction of said side and sole mold components, to cause the removal of said sole mold component from closed mold position before said side mold component is withdrawn from such closed mold position.

References Cited in the file of this patent

UNITED STATES PATENTS

| | | |
|---|---|---|
| 2,701,389 | Capdevila | Feb. 8, 1955 |
| 2,798,254 | Canat | July 9, 1957 |
| 2,801,442 | Moslo | Aug. 6, 1957 |
| 2,805,447 | Voges | Sept. 10, 1957 |